United States Patent
Chamings et al.

(10) Patent No.: US 6,640,648 B2
(45) Date of Patent: Nov. 4, 2003

(54) SEAT BELT FORCE SENSOR

(75) Inventors: Antony W. Chamings, Oxford, MI (US); Rudi Grzic, Sterling Heights, MI (US)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 10/068,116

(22) Filed: Feb. 5, 2002

(65) Prior Publication Data

US 2002/0104383 A1 Aug. 8, 2002

Related U.S. Application Data

(60) Provisional application No. 60/266,980, filed on Feb. 7, 2001.

(51) Int. Cl.[7] ............................................... G01N 3/08
(52) U.S. Cl. ................................................. 73/826
(58) Field of Search ........................... 73/862.637, 826, 73/862.636, 862.61, 862

(56) References Cited

U.S. PATENT DOCUMENTS 6,311,571 B1 * 11/2001 Norton ................... 73/862.637
6,450,534 B1 * 9/2002 Blakesley et al. ...... 73/862.451
6,520,032 B2 * 2/2003 Resh et al. ............. 73/862.472
2002/0062688 A1 * 5/2002 Lawson ...................... 73/159

* cited by examiner

Primary Examiner—Max Noori
(74) Attorney, Agent, or Firm—Markell Seitzman

(57) ABSTRACT

A force-sensing mechanism (20) comprising: a housing having first (22) and second (24) housing members; a slidable plate positioned between plate portions of the first and second housing members and moveable thereto; various spacers located between the first housing member and the sliding plate to space and stabilize the plate relative to the first and second housing members; a magnetic sensor stationarily mounted between the first and second housing members, a magnet moveable with the sliding member in response to forces applied to the first and second housing members and to the sliding plate; a spring assembly (250) having one end in operative engagement with the sliding plate and another end in operative engagement with the housing while biasing the sliding plate within the housing.

3 Claims, 5 Drawing Sheets

SEAT BELT FORCE SENSOR

This is a regularly filed utility patent application claiming priority of provisional patent application No. 60/266,980, filed Feb. 7, 2001.

BACKGROUND AND SUMMARY OF THE INVENTION

The invention generally relates to force sensing mechanisms and more particularly to one such sensor capable of measuring the tensile force produced within a buckled-up seat belt system.

It is an object of the present invention to provide an improved force sensing mechanism characterized by low sliding friction, ease of assembly and reduced cost.

It is a further object of the present invention to provide a force sensor or force sensing mechanism that is usable in cooperation with other sensors (including a weight sensor) to determine the normal force on a vehicle seat which is produced in part by the weight of the object or person on the seat and the tension within a seat belt system.

Accordingly the invention comprises: a force-sensing mechanism comprising: a housing having first and second housing members; a slidable plate positioned between plate portions of the first and second housing members and moveable thereto; various spacers located between the housing and the sliding plate to space and stabilize the plate relative to the first and second housing members; a magnetic sensor stationarily mounted between the first and second housing members, a magnet moveable with the sliding member in response to forces applied across the housing and to the sliding plate; a spring assembly having one end in operative engagement with the sliding plate and another end in operative engagement with the housing to bias the sliding plate within the housing.

Many other objects and purposes of the invention will be clear from the following detailed description of the drawings.

DETAILED DESCRIPTION OF THE DRAWINGS

Figure 1:
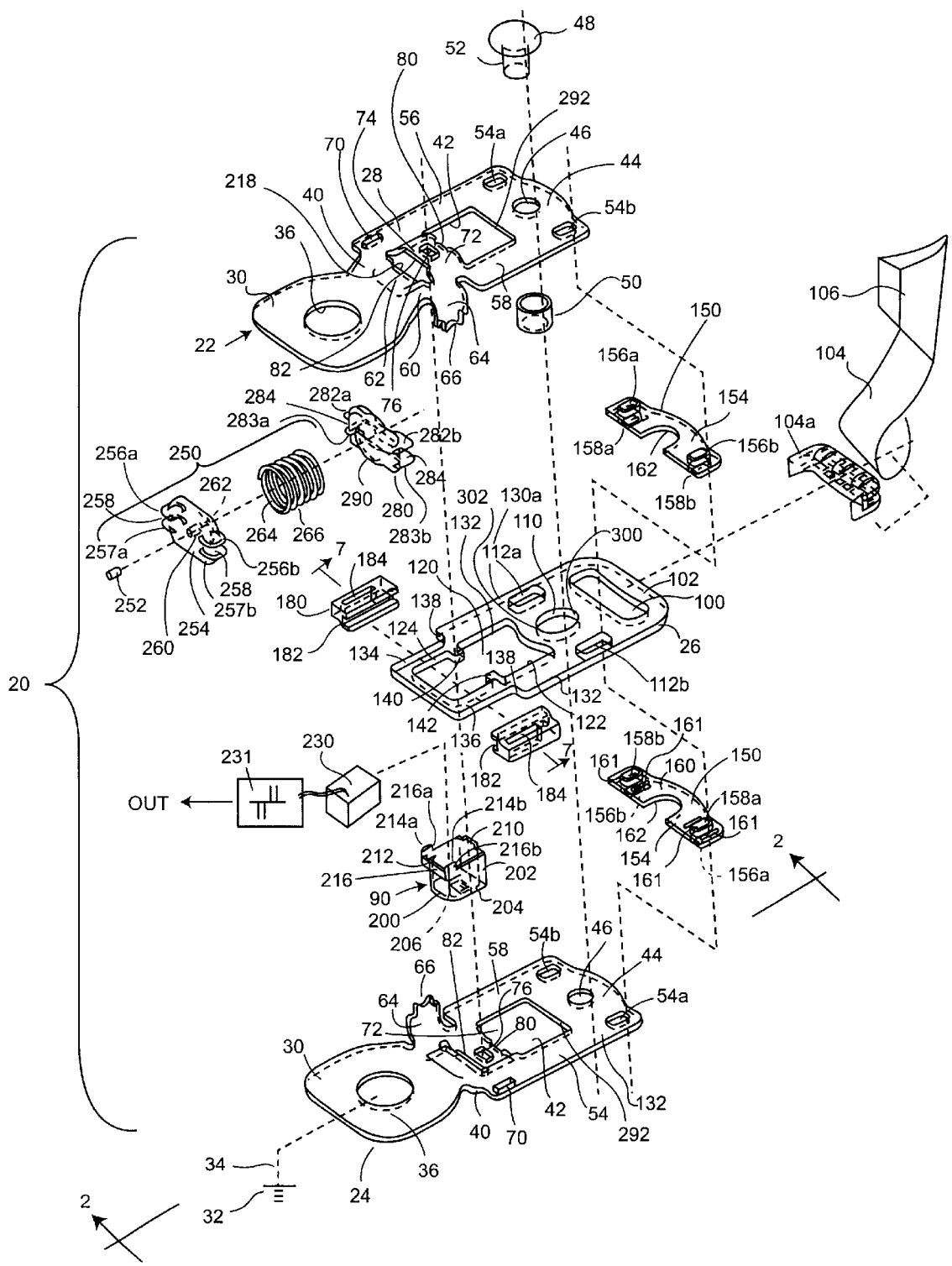
FIG. 1 is an exploded view of a force sensing mechanism in accordance with the present invention.
Figure 2:
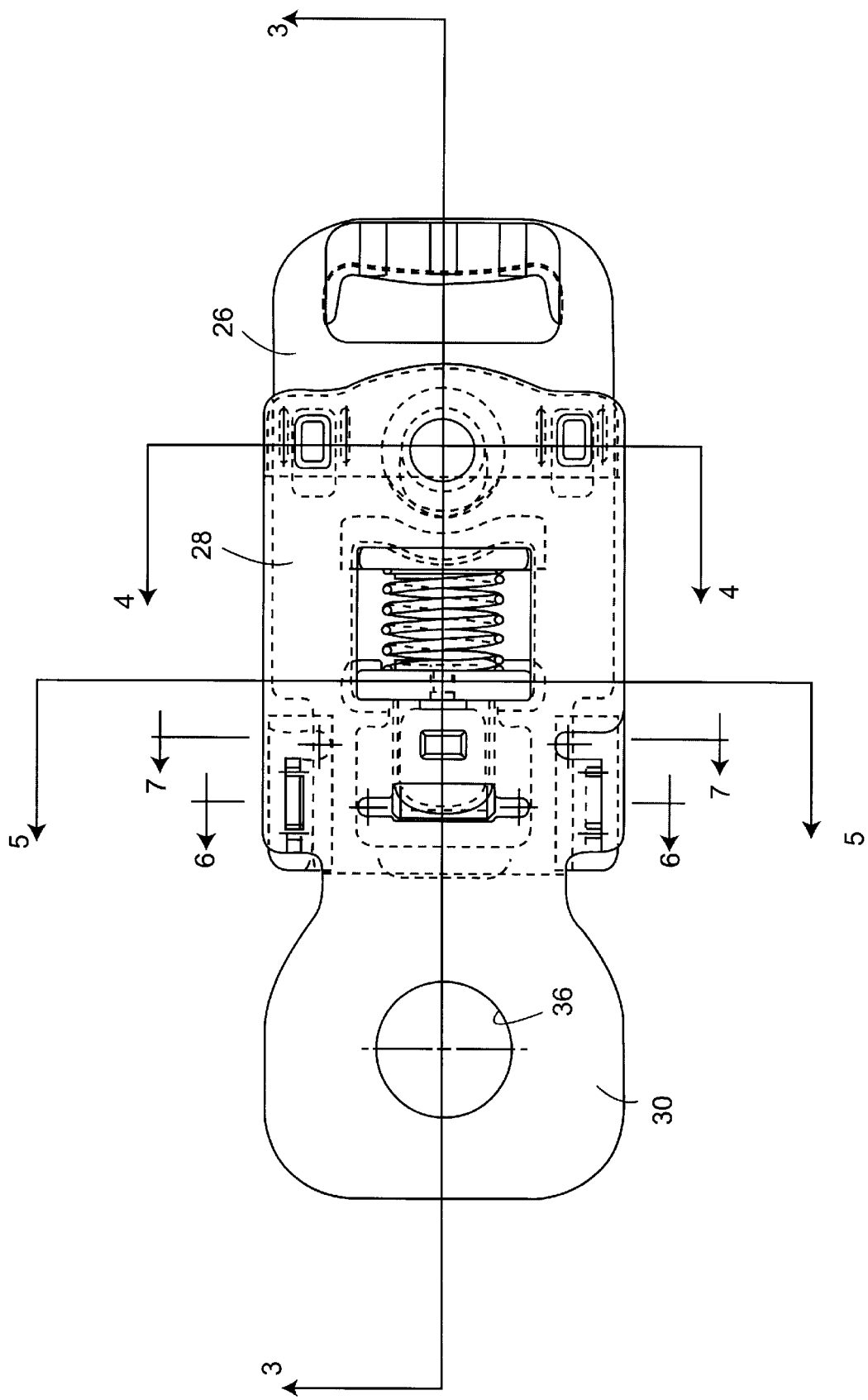
FIG. 2 is a plan view of the bottom of a force sensor.

Reference is made to FIGS. 1–4, which illustrate the major components of a seat belt force sensor or sensing mechanism 20. The major components of the force sensor 20 are: A housing having an upper housing member 22, a lower housing member 24 and a slide or sliding member 26. In the embodiment shown in FIG. 1, the housing members 22 and 24 are identical. Consequently, only one physical part need be produced as it can be used as both the upper and lower housing position. Further, in the preferred embodiment, the housing members 22 and 24 and the slide 26 are fabricated as stamped steel components, each having a coating to prevent corrosion and provide a uniform surface finish. Each of the housing members 22 and 24 includes a plate portion 28 and an anchor portion 30. The anchor portions 30 are secured to a structural component of the vehicle such as the floor or seat, generally shown by numeral 32 (in FIG. 2), through an anchor mechanism, which is also schematically shown by numeral 34. These anchor mechanisms can, for example, include a cable attached at one cable end to the anchor portion 30 and at the other cable end to a structural section of the vehicle or the seat, the seat belt pretensioner, or, alternatively, a fastener received through the openings 36 in the anchor portions. The anchor can be designed to permit the force sensor to rotate or move in one or move directions.

Figure 3:
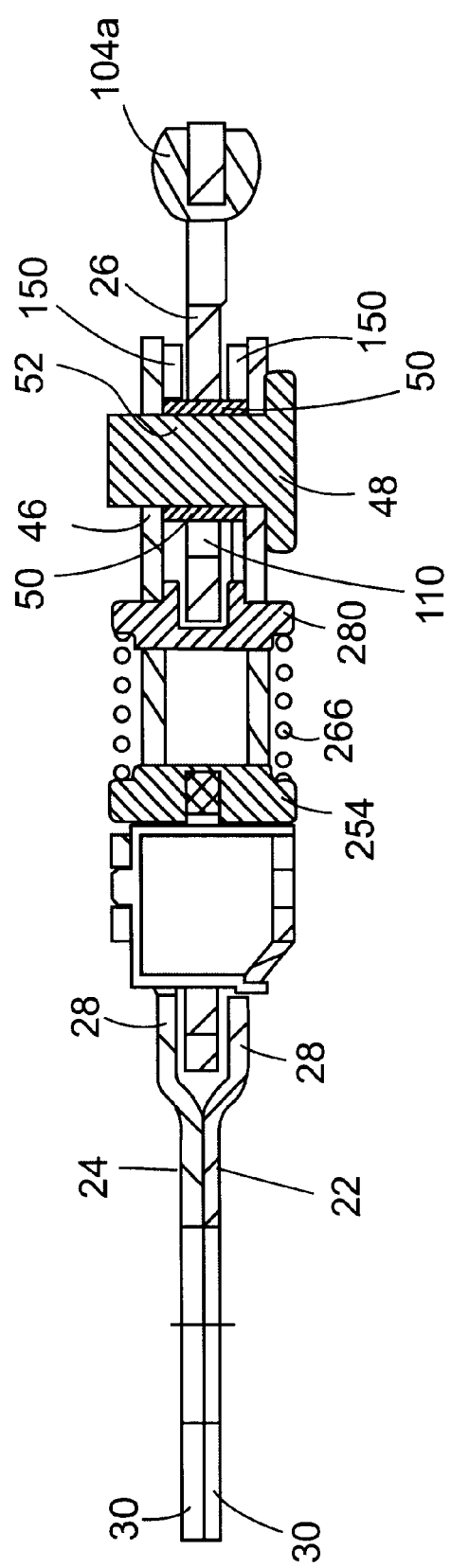
FIG. 3 is a cross-sectional view through section 3.3 of FIG. 2.

Reference is briefly made to FIG. 3, which is a cross-sectional view taken through the center of the mechanism 20. As can be seen from FIG. 3, the anchor portions 30 mate with each other while the plate portions of the upper and lower housing are spaced apart with the movable or sliding plate 26 positioned therebetween. Each of the plate portions 22 and 24 includes a ramped transition surface 40 connecting the portions 28 and 30. Each of the plate portions 30 is generally rectangular in shape defining a central opening 42. A first end 44 of each plate portion includes a central opening 46 through which is received a rivet 48. The rivet extends through an optional hardened steel bushing or sleeve 50, which assists in spacing the opposing plate portions apart and also serves as a mechanical stop to limit the extremes of motion of the sliding plate 26. If the bushing 50 is not used, its function is performed by the shaft 52 of the rivet. End 44 includes two oblong openings 54a and 54b. Each of the plate portions further includes a first side 56 and a second side 58. The plate additionally includes a second or opposing end 60, with a recessed portion (see numeral 62) recessed below the plane of the first and second side and first end. The first side 58 further includes a bent tab 64, which includes a forked end 66, which is bent over (swaged) during final assembly to secure the housing portions 22 and 24 together. Prior to bending over end 66, these ends are received within corresponding openings 70 in the opposing upper and lower housing members, as well as within a corresponding spacer 180 (which is also a guide).

Each of the housing members 20 and 22 includes an upraised bridge element 72, which extends above the plane of the first and second sides 56 and 58 of the plate portion 28. Each bridge element includes a flat, extended surface 74, which includes an opening 76. Each of the bridge elements also includes a small notch 80 adjacent opening 42 and an oppositely positioned larger notch 82. These notches 80 and 82 are used to capture facets of a sensor housing 90.

The sliding plate 26 includes a first oval opening 100, situated near end 102. It is this end of the plate that is secured to a connector or connecting member 104, such as a length of seat belt webbing, that is in turn connected or secured to a conventional seat belt buckle, generally shown as 106. If a flexible seat belt webbing 104 is used as this connector or connecting member 104, then an insert 104a is inserted within opening 100 to protect the seat belt webbing 104 from any sharp edges that may exist about the opening 100. Positioned to the rear (that is, to the left in FIG. 1) of the opening 100 is an oval opening 110. Positioned on either side of the oval opening are rectangular or oval openings 112a and 112b, each of which has a length sufficient to not interfere with the motion of the sliding plate before ft reaches it's maximum excursion limited by the oval opening 110 and spacer 50. Positioned rearward of the oval opening 110 is a larger opening, generally identified by numeral 120. This opening has a first part 122 and a second part 124. The width of this second part or opening 124 is narrower than the width of opening 124. Additionally, it should be noted sides 130 and 132 of plate 26 are narrowed at numerals 134 and 136. The slide or sliding plate 26 also includes projections 140 and 142, which extend into opening 120.

Figure 4:
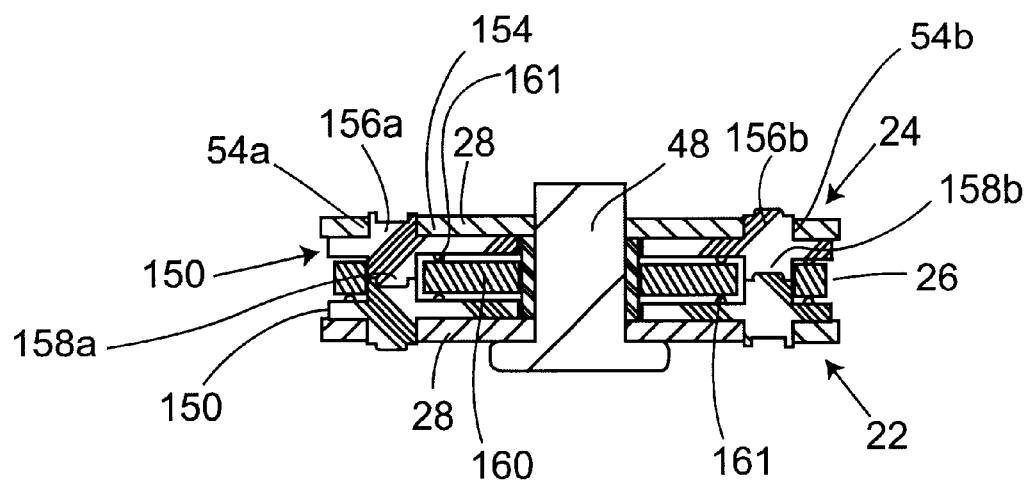
FIG. 4 is a cross-sectional view through section 4.4 of FIG. 2.
Figure 5:
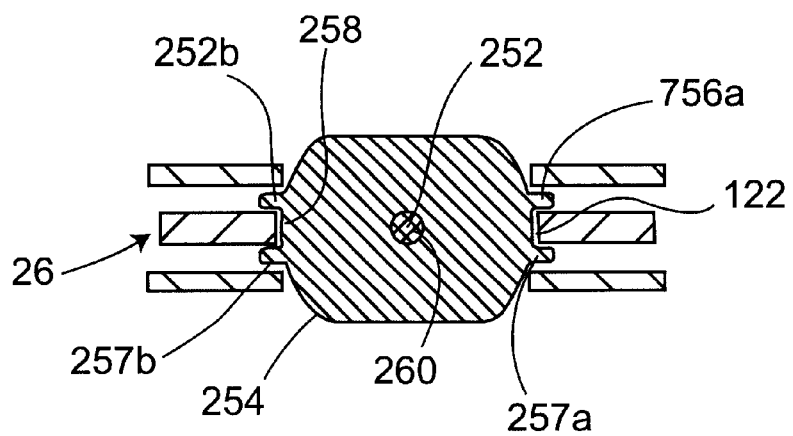
FIG. 5 is a cross-sectional view through section 5.5 of FIG. 2.
Figure 7:
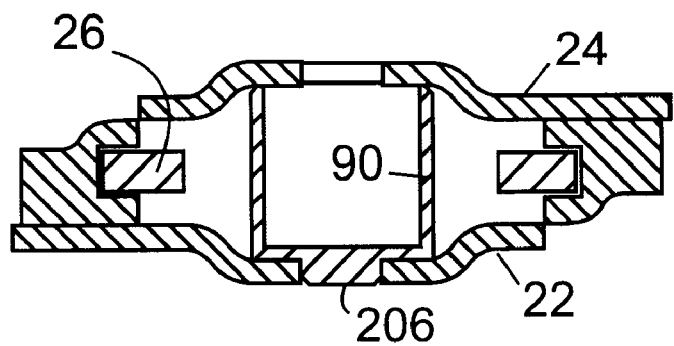
FIG. 7 is a cross-sectional view through section 7.7 of FIG. 2.
Figure 6:
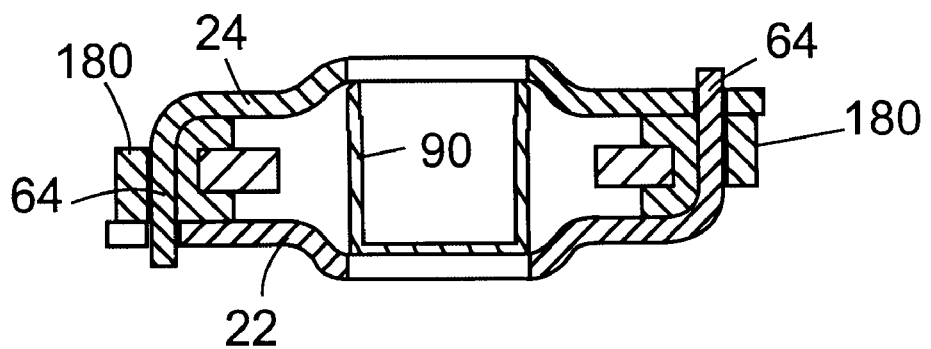
FIG. 6 is a cross-sectional view through section 6.6 of FIG. 2.

In order to prevent binding of the sliding plate 102, the sensing mechanism 20 further utilizes two identically shaped inserts, both of which are shown by numeral 150 (also shown in FIG. 4). Each of the inserts 150 includes a first surface 154 having a plurality of rectangular projections 156a and 156b, extending therefrom. As can be appreciated, surface 154 of the lower insert 150 is not visible in FIG. 1. Each of the projections 156a and 156b is received within a corresponding opening 54a and 54b in each of the housing members. Preferably the projections 156a and 156b are tightly received within the corresponding openings. Each of these inserts includes a second set of projections 158a and 158b extending from another surface 160. The projections of each two insert pieces 150 nest with each other to ensure they are aligned laterally and vertically as shown in FIG. 4. Extending from surface 160 is a plurality of small tabs 161. Additionally, each insert includes an oval shaped slot 162, that is sized to prevent the insert (when is in place on its respective housing member 22 or 24) from interfering with the rivet 48 and/or sleeve 50. Each of the projections 158a and 158b is received into the top and bottom of openings 112a and 112b of the plate 26. As can be appreciated from FIG. 3, the projections 150a and 150b, after insertion within the openings 112a and 112b, mate with each other and, as can be seen, these inserts as well as the bushing maintain the spacing between the upper and lower housing members. Additionally, the tabs 161 provide for a low-friction surface upon which the sliding plate 26 can slide and, further, the projections 158a and 158b laterally stabilize the plate 26.

The opposite ends 60 of each of the housing members 22 and 24 are spaced apart by the step on 64. A pair of spacers 180 which assist in the spacing of the members 22 and 24 but are designed not to take high loads which are absorbed by each step 64. Each spacer 180 includes each a longitudinal slot 182, which is respectively received on side 134 and 136 of the plate 26. Additionally, each spacer includes a vertical slot 184 (as seen in FIG. 1). During assembly, a corresponding tab 64 from each of the housing members 22 and 24 is first received through opening 184 prior to being received within the corresponding opening 70 in the opposing housing member. The spacers 180 laterally stabilize the rear end of the plate 26 and also provide a low-friction surface upon which sides 134 and 136 can slide. As mentioned above, the sensor mechanism 20 includes a sensor housing 90. The housing 90 includes a cup-shaped body 200 having side walls 202 and a bottom 204. Extending from the bottom is a projection 206, which is received within opening 76 of the lower housing member 24. One of the walls 202 includes an upraised tab 210, which is received within groove 80 of the upper housing member. The sensor housing 90 further includes a rearwardly extending ledge 212, which includes on an upper surface thereof tabs 214a and 214b. The vertical surfaces 216a and 216b of tabs 214a and b are received within the groove 82 of the upper housing member 22 while the rear surface 216 of the extension 212 rests against the side 218 of the depressed portion 62 of end 60 of the plate portion 28 of the upper housing member 22. In the illustrated embodiment, a Hall effect sensor 230 is received within the sensor housing 90. The Hall effect sensor and its conditioning electronics 231 can provide an analog signal indicative of the spacing and hence the force applied to the sensor sensing mechanism. In other applications a continuous analog signal is not needed and a digital Hall effect sensor can be used. As used herein a digital Hall effect sensor would be a conventional Hall effect sensor with a threshold established by associated electronics 231 such that the Hall effect sensor (and its electronics) will only generate an output signal if the applied force and hence the magnetic field exceeds falls below the threshold level.

The force sensing mechanism 20 further includes a spring subassembly 250, part of which holds a magnet 252. The spring assembly 250 includes a first backer plate 254 having two sets of laterally extending wings 256a and 256b and 257a and 257b. The sets of wings are spaced apart by a distance designated by numeral 258. The rear surface of plate 254 includes a recess 260 into which the magnet 252 is received. The front or opposite surface includes a circular projection 262 that is received within the inner diameter 264 of a compression spring 266. As can be appreciated, the circular projection 262 stabilizes the rear end of spring 266. Positioned on the other side of spring of 266 is another plate 280 having two sets of wings 282a and 282b and 283a and 283b. Each of the sets of wings is spaced apart by a distance shown by numeral 284. The plates 254 and 280 and the spring 266 are received within the major diameter opening 122 of plate 26. Additionally, portions of these plates 258 and 280 and spring 266 extend into the openings 42 in the upper and lower housing members. When the rear plate 254 is received within opening 122, the pairs of wings 256a and 256b envelop the inner wall 122 of the sliding plate 26. The front plate 280, while being received within opening 122, actually rides upon the exterior surfaces of the upper and lower housing members. More particularly, the spacing 284 between each set of wings 282a and 282b is sufficient to permit each wing of these respective sets of wings to slide on the top and bottom surfaces of the upper and lower housing members. The spring 266 is mounted, as mentioned above, such that end 264 is received about the circular boss 262, while its opposite end is received about another circular boss 290 on plate 280.

As can be seen, spring 266 biases plate 280 rearwardly so that plate 254 bottoms against projections 140 and 142. The spring 266 also biases plate 260 forwardly (or rightwardly in FIG. 1), which pushes the forward surface of the plate 280 against the surface 292 at the forward ends of openings 42.

In its unforced condition, that is without any tension applied across the force sensing mechanism 20, the plate 254 with its magnet 252 is positioned, as mentioned above, against the projections 140 and 142. The bias force applied to the projections 140 and 142 cause the sliding plate 126 to slide rearwardly such that the forward end 300 of the oval opening rests on a corresponding side of the sleeve 50, which thereby establishes an initial spacing between the magnet 252 and the Hall effect sensor 230. As a force is applied by the seat belt 104 to end 102 of the sliding plate 26, the plate moves outwardly relative to the housing members 22 and 24 against the bias force of the spring 266 as the anchor portions 30 are held fixed. As the force increases, the spacing between the magnet 252 and the sensor 230 varies, thereby providing a measure of the displacement between the stationary sensor 230 and the moveable magnet 252, which is directly correlatable to the force applied by the seat belt. The size of the oval opening 110 and the adjacent openings 112a and 112b are sized such that, with exceptionally large forces, the sliding plate 26 is permitted to move outwardly until the inner surface 302 abuts a corresponding surface of the sleeve 50, which defines the maximum range of motion of the sliding plate.

Many changes and modifications in the above-described embodiment of the invention can, of course, be carried out without departing from the scope thereof. Accordingly, that scope is intended to be limited only by the scope of the appended claims.

What is claimed is:

1. A force-sensing mechanism (20) comprising:
   a housing having
   first (22) and second (24) housing members, each of the first and second housing members including respective plate portions (28), which are spaced apart;
   a slidable plate (26) positioned between the plate portions of the first and second housing members and moveable thereto;
   first and second spacers (150), a first spacer received between the first housing member and the sliding plate and a second spacer received between the second housing member and the sliding plate to space and stabilize the plate relative to the first and second housing members, the first and second spacers are received within corresponding apertures (112*a,b*) of the sliding plate 26;
   third and fourth spacers (180) positioned between the first and second housing members, each of the third and fourth spacers including a longitudinal slot (182) thereon to receive a corresponding portion of the sliding plate, each of the third and fourth spacers including slots (184) that are oriented generally perpendicular to the direction of movement of the sliding plate;
   a magnetic sensor (230) stationarily mounted between the first and second housing members, a magnet (252) moveable with the sliding member in response to forces applied to the first and second housing members and to the sliding plate;
   a spring assembly (250) having one end in operative engagement with the sliding plate and another end in operative engagement with the housing while biasing the sliding plate within the housing.

2. The sensor mechanism as defined in claim 1 wherein an end of the housing, which receives the first and second spacers, is secured together by a rivet assembly and wherein the sliding plate includes an oblong opening (110) and wherein the rivet assembly is received through the oblong opening (110), wherein the cooperation between the oblong opening and the rivet assembly provide at least one motion stop for the sliding motion of the sliding plate (26).

3. A force-sensing mechanism (20) comprising:
   a housing having first (22) and second (24) housing members;
   a slidable plate positioned between plate portions of the first and second housing members and moveable thereto;
   various spacers located between the first housing member and the sliding plate to space and stabilize the plate relative to the first and second housing members;
   a magnetic sensor stationarily mounted between the first and second housing members, a magnet moveable with the sliding member in response to forces applied to the first and second housing members and to the sliding plate;
   a spring assembly (250) having one end in operative engagement with the sliding plate and another end in operative engagement with the housing while biasing the sliding plate within the housing.

* * * * *